Figure 1:
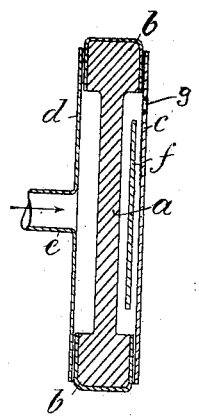

S. BENKÓ.
CARBON ELECTRODE FOR GALVANIC ELEMENTS.
APPLICATION FILED JUNE 17, 1909.

1,011,559.  
Patented Dec. 12, 1911.

Witnesses  
C. Schallinger  
R. Goodstein

Inventor  
Stephan Benkö  
by J. Singer  
Attr

UNITED STATES PATENT OFFICE.

STEPHAN BENKÖ, OF BUDAPEST, AUSTRIA-HUNGARY, ASSIGNOR TO COMPANY LIMITED FOR EXPLOITATION OF INVENTIONS BY STEPHAN BENKÖ, OF BUDAPEST, AUSTRIA-HUNGARY.

CARBON ELECTRODE FOR GALVANIC ELEMENTS.

1,011,559.  Specification of Letters Patent.  Patented Dec. 12, 1911.

Application filed June 17, 1909. Serial No. 502,737.

*To all whom it may concern:*

Be it known that I, STEPHAN BENKÖ, a subject of the King of Hungary, and a resident of Budapest, in Austria-Hungary, have invented a new and useful Improvement in Carbon Electrodes for Galvanic Elements, of which the following is a full, clear, and exact specification.

My invention relates to carbon electrodes for galvanic elements in which the electrolytic fluid or the depolarizing gas or a mixture thereof is conducted through the pores of the carbon electrodes.

In all processes connected with galvanic elements in which the pores of the carbon electrodes are filled with oxygen, chlorin or their depolarizing compounds or mixtures such as air or in which the electrolytic fluid is conducted through the pores in a way similar to those processes in which the electrolyte mixed with the depolarizer is conducted through the wall or pores of the carbon electrodes as described in my U. S. Letters Patents Nos. 942704, 963852 and 974016, a difference of pressure must be caused between the two sides of the carbon to obtain the energy required for conducting the gases fluids or mixtures of these. Experiments have shown that these processes cause effectual depolarization of the negative electrodes (carbon or graphite electrodes) as well as the creation of a constant and strong current provided that the electrolytic fluid or the depolarizing gas or a mixture of these actually forces its way through the pores and the constant and strong current obtained can be led away into the outer circuit in sufficient quantity. It is essential to observe the first condition, since that part of the depolarizing medium which does not pass through the pores but gets to the other side by passing around the surface of the carbon electrodes is of course lost to the depolarization. But, the second condition must also be observed since even the best depolarization is useless if the current can not be passed off in sufficient quantity, because the advantages of depolarization can only be utilized in the outer circuit. These two conditions can, however, only be observed with many technical difficulties.

The difference of pressure required on the sides of the carbon electrodes can only be obtained when a fluid or gas conduit is so connected to one of the surfaces of the porous carbon walls, that the same can join the carbon wall and be air and fluid tight or, in other words, the carbon body must be inserted in the circuit in such a way that the electrolyte acting under the influence of pressure or suction, or the gas, actually forces its way through the pores. The carbon, especially retort carbon suitable for this purpose, is very brittle and breakable and cannot stand the pressure of screws or similar fastening means. The application of these means is also made more difficult by the fact that very strong corrosive liquid must as a rule be employed as electrolytic liquids and these attack the metal. Lead cannot safely be employed. The production of a good contact also causes difficulties in that the porous carbon as compared with metals is a bad conductor, so that when using ordinary carbon clamps a large intermediate resistance is introduced whereby the inner resistance of the element is materially increased. Furthermore, the fluid pressed into the pores is led through the pores to the contact and has a corrosive action on the clamps, causing an injurious short circuit as well as a strong intermediate resistance; when a lead plate is interposed and sulfuric acid is used, a badly conducting sulfate of lead is formed. Now, by my invention, all these disadvantages can be avoided.

According to my invention that edge of the carbon which separates the two sides of the carbon under different pressures (in flat carbons for example the two sides, or in hollow carbon electrodes the outer and inner surfaces), is provided with a conducting metal frame or the like in such a manner that a certain part of the porous electrodes is surrounded (the part inside the frame) so that the gas or fluid, or mixture of these, flowing under the action of pressure or suction can only flow through the surrounded pores. In this way the electrolytic fluid or the depolarizing gas, or mixture of these, actually passes through the pores and, moreover, a contact is established between the carbon electrode and the outer circuit which, with a suitable process for making the frame, lessens the intermediate resistance and almost destroys it. Furthermore, the metal frame surrounding the periphery of the carbon electrodes or the rim of the hollow carbon electrodes facilitates the enveloping of the carbon electrodes in a perfectly acid proof or acid proof and conducting material, to which the conduit of the electrolytic and depolarizing mediums may be connected. In the case of hollow carbon electrodes this conductor may be connected directly to the frame surrounding the rim whereby the connection may in both cases be effected by soldering or by forming the terminal in one piece with the envelop or covering.

Figure 2:
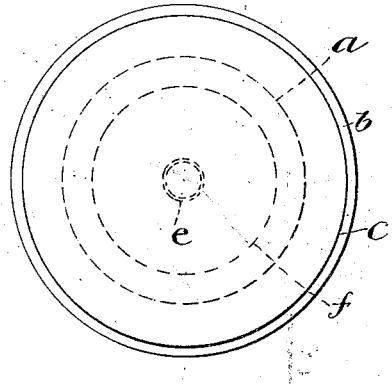

In the accompanying drawing, which illustrates two methods of carrying out my invention, Figure 1 shows a flat carbon which is recessed at the middle for facilitating the passage of the depolarizing medium and for the purpose of obtaining more space, but a perfectly flat carbon can of course be used if desired. Fig. 2 is a top plan view of an electrode showing the frame surrounding the same and Fig. 3 is a section similar to Fig. 1 showing a modification of a carbon electrode.

The carbon $a$ is completely surrounded by the frame $b$ so that the whole circumference of the carbon is inclosed in the frame. On one side of the frame is a plate $c$ of a material which will withstand the action of the electrolytic fluid, this plate $c$ being preferably of metal and forming a covering means for the carbon; on the other side is a similar plate $d$, to which is attached the conduit $e$ of the electrolytic and depolarizing medium. The zinc electrode $f$ is interposed between the carbon $a$ and the plate $c$. The plates $c$ and $d$ may be made integral with the frame $b$ but even when inclosing a completely flat carbon it is important to leave a space between the carbon and the envelop or covering to allow the passage of the electrolytic or depolarizing medium. The said fluid flows out of the apparatus through an aperture $g$.

In the construction shown in Fig. 1, it is assumed that the electrolytic or depolarizing medium, or mixture thereof, is conducted under pressure between plate $d$ and the carbon electrode, but it is evident that it may be by suction. When the frame $b$ firmly and tightly surrounds the edge of a carbon electrode, the medium which has passed through the pores cannot pass around the carbon at the surface contact between the carbon and frame but must force its way through the pores. If the carbon is not completely framed and the frame not perfectly tight, the medium can reach the other side of the carbon without passing through the pores and would be useless for the reasons above indicated.

Figure 3:
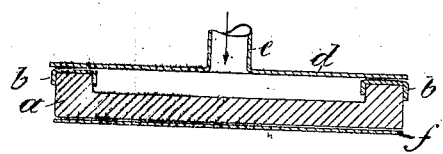

In the carbon electrode $a$ shown in Fig. 3, which is formed by deepening the carbon and thus producing a hollow carbon electrode, the metal frame $b$ is mounted at the mouth or rim. The plate $d$ is secured to the frame $h$ and the conduit $e$ is connected to the plate $d$. The zinc plate $f$ is situated underneath the carbon. The electrolyte enters through the conduit $e$ and penetrates through the pores of the carbon electrode which are not obstructed by the metal frame. In the modification shown in Fig. 1, the electrolyte leaves the interspace between the electrode $a$ and the closing plate $c$ through the aperture $g$, while in the modification illustrated in Fig. 3, the electrolyte acts upon the zinc plate $f$ after having passed through the pores of the electrode $a$. Both of the electrodes $a$ and $f$ are, of course, disposed within an ordinary battery vessel, not shown, and which may be filled with electrolyte.

The metal frame may be secured to the edge of the carbon in any suitable manner. Thus for example, the edge of the carbon may be simply cast with metal by which means however, complete tightness is not obtained. The tightness is in this case obtained by the contraction of the metal during the cooling. A more complete tightness can be obtained when a recess or groove is cut in the carbon into which metal is poured. A still more complete tightness is obtained when the process is carried out in accordance with the specification annexed to my Letters Patent No. 942704 in which the carbon is heated before the casting operation and the metal filled in under pressure whereby the pores of the carbon are to a certain extent impregnated with the metal. The most perfect tightness can be obtained by the following process, in which the edge portion of the carbon and metal form one whole since the carbon pores of said portion are completely impregnated with the metal. In one process gaseous metal or metal vapor is introduced into the pores. The metal on cooling settles in the pores and so impregnates them. In carrying out the process that part of the carbon which is to be provided with the frame is subjected to the action of the gaseous metal or metal vapor.

In a further modification of the process the part of the carbon to be provided with a frame is dipped into a galvanic bath having a solution of a salt of the impregnating metal and thereupon the solution is pressed into or through the pores, the metal being precipitated in the pores by the electric current until the pores are completely filled with metal. Again, powdered retort carbon, graphite or mixtures of these, or other powdered carbon, can be galvanically coated with metal and the frame part obtained out of this carbon-metal powder during the manufacture of the carbon electrode. The manufacture of the carbon is carried out in the usual manner. This process may be so modified that the carbon powder is mixed with the powder of the metal in question and the frame produced by the process known in connection with the manufacture of carbon poles. In this and in the preceding example the metal combines with the carbon by compressing and thoroughly annealing the carbon in the known manner. The graphite or the carbon can be well mixed with the metal if the metal is molten and the carbon introduced as a powder while stirring, the stirring being continued until after completely cooling and the mixture of metal and carbon obtained as a sand-like powder.

What I claim as my invention and desire to secure by Letters Patent is:—

A carbon electrode for a battery in which fluid is forcibly conducted through the pores of the carbon, comprising in combination a carbon body and a metal frame, the carbon body being impregnated with metal adjacent its circumferential edge, and a portion of the frame being in contact with the impregnated portion and tightly inclosing the body.

In testimony whereof I affix my signature in the presence of two witnesses.

STEPHAN BENKÖ.

Witnesses:
JOSEPH WIRKMANN,
ROBERT BIRCZI.